Feb. 19, 1957     J. J. COSTOLOW     2,782,097
AMMONIUM SULFATE PRODUCTION
Filed June 25, 1953
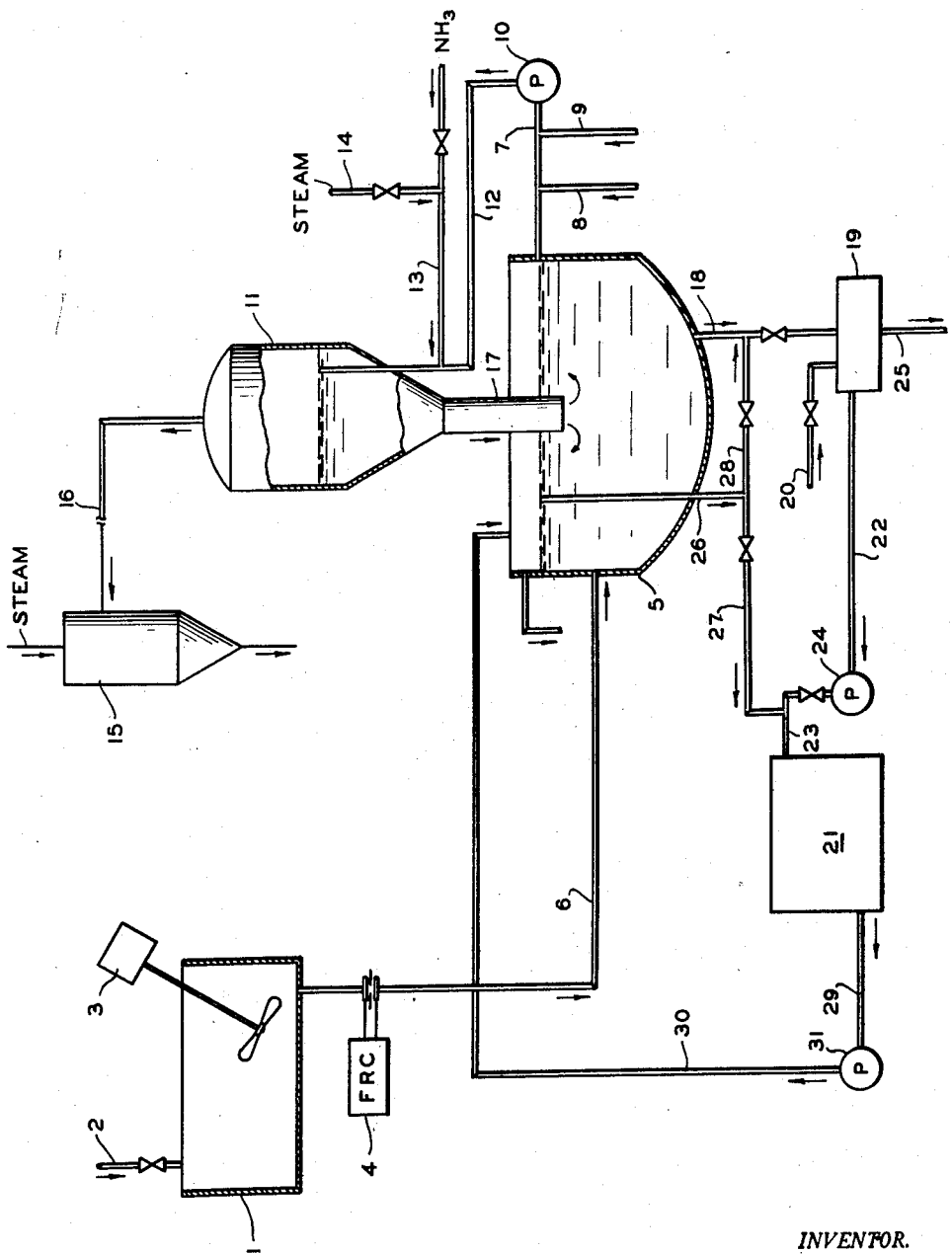
INVENTOR.
JOHN J. COSTOLOW
BY *Hudson & Young*
ATTORNEYS

2,782,097

AMMONIUM SULFATE PRODUCTION

John J. Costolow, Pasadena, Tex., assignor to Phillips Petroleum Company, a corporation of Delaware Application June 25, 1953, Serial No. 363,974

8 Claims. (Cl. 23—119)

This invention relates to a method for increasing the metastable region in an ammonium sulfate solution, thereby reducing the danger of objectionable fines being formed in the crystallizer.

In the operation of an ammonium sulfate continuous crystallizer, much difficulty has been encountered in crystals forming on the surface of the crystallizer thereby causing shutdowns for removing the deposited material. This operation of removing the deposited material is called desalting. A great deal of production time is lost each year due to the desalting operation.

In operating a continuous crystallizer of the "Kyrstal" or "Oslo" type, the salting out (crystal deposition) is minimized by controlling the rate of crystallization, that is, by maintaining the concentration of the solution in a region where larger crystals are formed as is further described hereinbelow.

It is known that the soluble trivalent salts of certain metals such as cerium, zirconium, chromium, iron, and aluminum will affect the crystals of ammonium sulfate as produced by evaporation of an ammonium sulfate solution. The salts of these metals have been used to regulate the size and/or shape of the ammonium sulfate crystals.

In crystallization by evaporation, an aqueous solution of the salt to be crystallized is put in the crystallizer. Water is removed by evaporation or the material is cooled until the saturation point is reached. During this first period of evaporation or cooling no crystals will be formed, nor will seed crystals grow. As water is further removed or the solution is further cooled the solution passes through a metastable region where no crystal nuclei are formed, but where crystals will grow if they should already be present. By adding crystals of the material to be crystallized in such a region, large crystals can be produced. Such a procedure is known as seeding. If the concentration of the solution is increased by evaporation or cooling faster than the crystals grow, the solution enters the labile region where crystal nuclei are formed whether or not seed crystals are present. These nuclei deposit on the walls of the crystallizer, they tend to stick or agglomerate, and are the source of salting in the crystallizer.

In crystallization by seeding, the solution is kept in the metastable region by removing water or cooling the solution at such a rate that the concentration is maintained in this metastable region. Ammonium sulfate for seed crystal growth comes from the solution. As this ammonium sulfate is removed from solution, water must be removed or the solution further cooled if crystals are to continue to grow. The concentration-temperature range defining the metastable region is rather narrow and it is difficult to operate within its narorw bounds. Consequently, the operation frequently causes the solution to enter the labile region and salting is encountered.

From the above discussion, it is obvious that it would be advantageous in the operation of a crystallizer to extend the metastable region over a wider range, that is, to lower the temperature at which nuclei will be formed at a given concentration or to increase the concentration at a given temperature at which nuclei are formed.

I have found that the soluble salts of chromium, iron, and aluminum which provide the following ions: $Cr^{+++}$, $Fe^{+++}$, and $Al^{+++}$ will extend the metastable region.

As indicated hereinbefore this invention is of particular importance in continuous crystallization processes where control is particularly difficult. My invention is, therefore, particularly applicable to the production of ammonium sulfate crystals in "Kyrstal" or "Oslo" crystallizer where the ammonium sulfate tends to crystallize out on the surface of such crystallizers due to the spontaneous nucleation. In such crystallizers, it is difficult to maintain the solution in the metastable region.

An object of my invention is to provide a means for extending the metastable region in an ammonium sulfate solution. A further object of my invention is to provide a method of operating a continuous crystallizer in the production of ammonium sulfate crystals whereby salting out is minimized.

I have found that the concentration of the applicable metallic ions in the ammonium sulfate mother liquor is higher if a concentrated solution of the salt in water is first made and the solution is slowly added to the mother liquor. That is, when the salt is added in crystalline form to the mother liquor of ammonium sulfate, the concentration of ion is not increased as much as by adding an aqueous solution of the salt. When crystals are added to the mother liquor, the salt crystals probably adhere to the ammonium sulfate crystals and are removed from the system along with the ammonium sulfate crystals. As indicated hereinbefore the amount of the particular ion to be used must be sufficient to extend the metastable region. This quantity will generally be in the range of 5 to 1000 parts per million parts of mother liquor and preferably from 50 to 500 parts per million parts of the mother liquor.

I will further describe my invention incorporated in one of its preferred embodiments by referring to the attached schematic drawing which is made a part of this specification. The attached drawing does not show conventional valves, pumps, motors, etc. The attached drawing is for illustrative purposes only and my invention is not limited thereby. In my example, aluminum sulfate is the salt, but as has been herein stated, any salt providing one of the following ions is useful: $Fe^{+++}$, $Cr^{+++}$, and $Al^{+++}$.

Referring now to the drawing, water is admitted to mixing vessel 1 via conduit 2. Stirrer 3 is started and aluminum sulfate is added to the mixing vessel 1 and is throughly mixed into a concentrated solution. The concentrated solution is admitted by means of a flow recorder controller 4 to crystallizer 5 via conduit 6. The flow of aluminum sulfate solution is regulated so as to maintain the ion concentration in the crystallizer at the desired level.

Mother liquor is continuously removed from the crystallizer 5 via conduit 7. Water is added to the mother liquor in conduit 7 via conduit 8. While the invention is not limited thereto, I add water at the rate of 1.8 gallons of water per gallon of sulfuric acid (below). Sulfuric acid is added to conduit 7 via conduit 9. The mother liquor, water and sulfuric acid are mixed in pump 10 and pumped to the evaporator 11 via conduit 12. Ammonia vapor and steam are added to the conduit 12 via conduits 13 and 14. The ammonia is added in slightly less than stoichiometric amounts to react with the $H_2SO_4$. A vacuum is maintained in crystallizer 11 via means of barometric condenser and steam ejector 15. Water is removed from the evaporator 11 to the barometric condenser 15 via conduit 16. The concentrated ammonium sulfate solution gravitates to the crystallizer 5 from evaporator 11 through the evaporator leg 17.

The ammonium sulfate solution in the crystallizer is maintained in the metastable region. Crystals, previously formed, are continuously broken up by passing through the pumps etc. and the fines produced from this cracking of the crystals provided nuclei for growth. The ammonium sulfate in the metastable solution will come out of solution by adding to the crystal nuclei. Seed nuclei are also produced when the solution is concentrated past the metastable region into the labile region. Nuclei can also be provided by adding seed crystals to the system.

It is advantageous to operate in the metastable region at all times and depend entirely upon cracking of crystals to provide the seed nuclei. It is difficult to control the crystallizer within the metastable region at all times and occasionally the solution will enter the labile region and nuclei will form. The use of the ions disclosed will minimize this occurrence.

Crystals are continuously removed from the crystallizer 5 via conduit 18 to centrifuge 19. Water for washing the crysals is added to said centrifuge via conduit 20. The mother liquor is removed from the crystals in the centrifuge and is pumped to sump tank 21 via conduits 22 and 23 by means of pump 24. The washed crystals are removed from the centrifuge via conduit 25.

Stand pipe 26 is provided to take care of overflow in the crystallizer 5 should the crystal conduit 18 become stopped. This overflow liquor is ordinarily sent to the sump tank 21 via conduit 27. However, provision is made to send the overflow through the centrifuge 19 via conduits 28 and 18. This latter procedure might be desirable when conduit 18 becomes stopped and the system contains too much liquor or when it is desirable to remove the crystals from this overflow.

Liquid from the sump tank 21 is recirculated to the crystallizer via conduits 29 and 30 by means of pump 31.

I prefer to operate the above described system by keeping the temperature in the vaporizer between 140 and 160° F. and preferably at about 150° F. and at a pressure of 4 to 6 inches of mercury absolute. The temperature in the crystallizer will then be 1–5° F. below the temperature of the vaporizer. The aluminum sulfate may be added at any point in the system and at any concentration which does not cause appreciable precipitation. I prefer to prepare a concentrated aluminum sulfate solution and to maintain the salt concentration in the crystallizer between 50 and 500 parts per million parts of mother liquor and preferably between 400 and 500 parts per million. I prefer to operate my crystallizer so that the pH of the solution is less than 6 and preferably in the range of 2 to 3.

When operating a continuous crystallizer system according to the method as outlined above, the crystals appear to be the same size and shape as they appear when no metallic ion is added. Table I below shows that the crystal size of the material remains substantially the same.

TABLE I

| Period | Percentage Retained on Screen Nos.— | | | | Percent Passing +20 | Av. Aluminum Content, p. p. m. |
|---|---|---|---|---|---|---|
| | 10 | 12 | 16 | 20 | | |
| 1 | 0.3 | 0.5 | 6.3 | 25.3 | 32.4 | 0 |
| 2 | 0.2 | 0.6 | 6.2 | 25.0 | 32.0 | 101 |

I have found that although the average screen analysis is not affected, that I can operate my continuous crystallizer for much longer periods before I need to shut down for a desalting operation. Table II shows these data where the production rate was substantially the same.

TABLE II

| Period | Average Unit Prod. Rate, T./D. | Average on Stream Time of Crystallizer, Hrs. | | | | Length of Period in Days | Aluminum Content in the Mother Liquor, p. p. m. |
|---|---|---|---|---|---|---|---|
| | | No. 1 | No. 2 | No. 3 | No. 4 | | |
| 1 | 174 | 210 | 346 | 438 | 325 | 20 | 0 |
| 2 | 186 | 366 | 134 | 455 | 330 | 27 | 0 |
| 3 | 186 | 159 | 393 | 326 | 396 | 16 | 0 |
| 4 | 166 | 600 | 481 | 543 | | 51 | 57 |
| 5 | 170 | 888 | 761 | 860 | 950 | 47 | 118 |

Table III is provided to show the effect of the ions $Cr^{+++}$, $Fe^{+++}$ and $Al^{+++}$ on the metastable region in an ammonium sulfate solution. These data were obtained by preparing an aqueous solution of ammonium sulfate which would be saturated at 140° F. Measured amounts of ammonium sulfate crystals and distilled water were added to four ounce sample bottles and the desired amounts of metallic ions to be tested were weighed into the bottles. The bottles were fitted with rubber stoppers through which thermometers were placed. The bottles were then heated until all of the crystals were in solution. The solutions were concentrated by cooling and agitation in a shaker, said shaker providing motion in excess of the critical amount so that the effect of agitation on the super-saturation could be neglected. Brief interruptions of the shaking were made to determine the temperature of nuclei formation. Constant results for blank determinations made with each set of samples and duplication of results provided the comparable data. These data are shown in Table III.

TABLE III

*Effect of ions at various concentrations on the metastable region of supersaturation of ammonium sulfate*

| Material | Temperature at which Nuclei were observed | | | | | | | |
|---|---|---|---|---|---|---|---|---|
| | 0 p.p.m. | 10 p.p.m. | 50 p.p.m. | 100 p.p.m. | 200 p.p.m. | 300 p.p.m. | 500 p.p.m. | 1,000 p.p.m. |
| $Al^{+++}$ | 128 | 127 | | 119 | 110 | 107 | 90 | 70 |
| $Cr^{+++}$ | 128 | 127 | 122 | 123 | | | 64 | 50 |
| $Fe^{+++}$ | 127 | 126 | | 122 | 82 | 70 | 50 | 16 |

It will be apparent to one skilled in the art that with the information disclosed in this specification and the tables thereof, that many modifications can be made without departing from the scope of this invention. My invention is not restricted to the preferred embodiments used for illustrative purposes in this specification.

I claim:

1. A process for the continuous production of ammonium sulfate crystals which comprise continuously reacting sulfuric acid and ammonia in the presence of water to form ammonium sulfate in aqueous solution, adding a soluble salt which ionizes to produce an ion selected from the group consisting of $Cr^{+++}$, $Fe^{+++}$, and $Al^{+++}$ in an amount sufficient to extend the temperature and concentration region wherein said solution is metastable to crystal formation, removing water from said solution until said solution is of a concentration metastable to crystal-formation, maintaining the resulting solution in the temperature and concentration region wherein the solution in metastable to crystal formation, providing seed crystals of ammonium sulfate in said metastable solution, growing said seed crystals in said metastable solution, removing a slurry of crystals, separating crystals from liquid from the removed slurry, and returning the liquid to the metastable solution.

2. An aqueous process for the continuous production of ammonium sulfate crystals which comprises continuously adding an aqueous solution of a trivalent metallic ion to an aqueous solution of ammonium sulfate in a crystallization zone, said trivalent ion being selected from the group consisting of $Cr^{+++}$, $Fe^{+++}$, and $Al^{+++}$, maintaining the ion concentration in said crystallization zone between 5 and 1000 parts ion per million parts of solution in said crystallization zone; withdrawing a portion of solution from said crystallization zone; adding water, ammonia, and sulfuric acid to said withdrawn solution using acid in excess of that required for reaction with ammonia; passing the resulting solution to an evaporization zone; removing a portion of the water in said evaporation zone to provide a solution of a concentration metastable to crystal formation; gravitating the resulting solution to said crystallization zone; maintaining the pH of the gravitated solution at a pH less than 8 by means of said excess acid; maintaining the concentration of ammonium sulfate in aqueous solution in said crystallization zone in the temperature and concentration region wherein said solution is metastable to crystal formation; breaking crystals in said crystallization zone to form crystal seeds; allowing said crystal seeds to grow; withdrawing a portion of the crystals and solution from the crystallizer; separating crystals from last solution withdrawn; and recirculating the solution having crystals removed to the crystallization zone.

3. An aqueous process for the continuous production of ammonium sulfate crystals which comprises continuously adding an aqueous solution of a trivalent metallic ion to an aqueous solution of ammonium sulfate in a crystallization zone, said trivalent ion being selected from the group consisting of $Cr^{+++}$, $Fe^{+++}$, and $Al^{+++}$; maintaining the ion concentration in said crystallization zone between 50 and 500 parts ion per million parts of solution in said crystallization zone; withdrawing a portion of solution from said crystallization zone; adding water, ammonia and sulfuric acid to said withdrawn solution using acid in an amount in excess of that required for reaction with said ammonia; passing the resulting solution to an evaporation zone; removing a portion of the water in said evaporation zone to provide a solution of a concentration metastable to crystal formation; gravitating the resulting solution to the crystallization zone; maintaining the pH of the solution in said crystallization zone in the range of 2 to 3 by controlling the amount of said excess acid; maintaining the concentration of ammonium sulfate in aqueous solution in said crystallization zone metastable to crystal formation; breaking crystals to provide crystal seeds in said crystallization zone; allowing said seed crystals to grow; withdrawing a slurry of solution and crystals from the crystallization zone; separating crystals from said withdrawn slurry; and returning the remaining solution to said crystallization zone.

4. A method for reducing salting out in a continuous process for the production of ammonium sulfate which comprises continuously reacting ammonia and sulfuric acid in an aqueous medium; concentrating the resulting ammonium sulfate solution by evaporation to a concentration wherein the resulting solution is metastable to crystal formation in the presence of a trivalent ion selected from the group consisting of $Cr^{+++}$, $Fe^{+++}$, and $Al^{+++}$ in an amount to extend the concentration range wherein said solution is metastable to crystal formation; maintaining said solution at a concentration wherein said solution is metastable to crystal formation; providing crystals seeds to said metastable solution; allowing said seed crystals to grow; and separating and recovering the resulting grain crystals.

5. The method of claim 4 wherein the trivalent ion is present in an amount in the range of 50 to 1000 parts ion permillion parts of metastable solution.

6. The method of claim 4 wherein the trivalent ion is present in an amount in the range of 400 to 500 parts ion per million parts of metastable solution.

7. The method of claim 6 wherein the trivalent ion is $Al^{+++}$.

8. A process for the continuous production of ammonium sulfate crystals which comprises adding an aqueous solution of a salt containing ions selected from the group consisting of $Cr^{+++}$, $Fe^{+++}$, and $Al^{+++}$ to an aqueous solution of ammonium sulfate in an amount sufficient to extend the concentration and temperature region wherein said aqueous solution of ammonium sulfate is metastable to crystal formation; continuously withdrawing a portion of the resulting solution; adding sulfuric acid and ammonia to the withdrawn solution forming additional ammonium sulfate solution; concentrating last solution until the solution has a concentration in said metastable range; maintaining the solution in said metastable region; growing ammonium sulfate crystals on seed crystals in the resulting metastable concentrate; cracking grown crystals to provide said seed crystals; removing a slurry of crystals from metastable concentrate; separating crystals from solution in said withdrawn slurry; and returning the last said solution to the system.

References Cited in the file of this patent

UNITED STATES PATENTS

| | | |
|---|---|---|
| 1,919,707 | Adam | July 25, 1933 |
| 2,092,073 | Jeltsch et al. | Sept. 7, 1937 |
| 2,226,101 | Agden | Dec. 24, 1940 |
| 2,228,742 | Appleby | Jan. 14, 1941 |
| 2,416,744 | Francis | Mar. 4, 1947 |
| 2,424,207 | Otto | July 15, 1947 |
| 2,443,765 | Francis | June 22, 1948 |
| 2,623,814 | Gray | Dec. 30, 1952 |
| 2,631,084 | Robinson | Mar. 10, 1953 |